United States Patent [19]
Bennett

[11] 3,893,549
[45] July 8, 1975

[54] BRAKE APPLY AND RELEASE MECHANISM

[75] Inventor: Ronald W. Bennett, Miamisburg, Ohio

[73] Assignee: General Motors Corporation, Detroit, Mich.

[22] Filed: Mar. 25, 1974

[21] Appl. No.: 454,096

[52] U.S. Cl. ............................................. 188/170
[51] Int. Cl. ......................................... F16d 65/24
[58] Field of Search .......... 188/170; 192/9 R; 92/63

[56] References Cited
UNITED STATES PATENTS

| | | | |
|---|---|---|---|
| 1,964,693 | 6/1934 | Hill | 192/91 R X |
| 2,282,615 | 5/1942 | Spalding | 188/170 X |
| 3,462,986 | 8/1969 | Cox, Jr. et al. | 92/63 |
| 3,613,839 | 10/1971 | MacDuff | 188/170 |
| 3,768,608 | 10/1973 | Fulmer | 188/170 |

Primary Examiner—George E. A. Halvosa
Attorney, Agent, or Firm—D. D. McGraw

[57] ABSTRACT

A vehicle brake assembly having a hydraulic apply for service brake operation and a spring apply for parking brake operation, the apply spring being held in a brake release condition by hydraulic pressure acting on a release piston. The hydraulic release pressure is generated by the master cylinder and is the same pressure used for service brake operation. Once the release piston pressure chamber is charged and the spring is compressed, the release holding pressure is trapped by appropriate valves. An independently controlled holding pressure release valve is operated when it is desired to release the pressure, causing the force stored in the spring to act, through the release and apply pistons and a floating push rod joining these pistons, to mechanically apply the brake. The vehicle operator must actuate the master cylinder with sufficient force and, using the master cylinder, pump a sufficient volume of fluid to move the release piston to the release position before the parking brake is released. A sensor and indicator system is provided which will indicate to the operator the point at which the release parking brake is applied and later the point at which the applied parking brake is released.

1 Claim, 2 Drawing Figures 3,893,549

BRAKE APPLY AND RELEASE MECHANISM

The invention relates to a vehicle parking and service brake, and more particularly to one which is fluid pressure applied for service operation and is spring applied but fluid pressure released for parking operation. It is a feature of the invention that the fluid pressure to apply the service brake and the fluid pressure to release the parking brake is generated by the same fluid pressure generator, which in a hydraulic brake system may be a master cylinder or other suitable controlled pressure source.

Another feature of the invention relates to the mechanism for actuating the parking brake by release of force stored in a resilient member such as a compression spring. A trapped parking brake release pressure holds the resilient member in such a position that it exerts no brake applying force during vehicle operation. When the parking brake is to be applied, a valve is opened under independent control of the operator to release the trapped pressure and thereby allow expansion of the resilient member with sufficient force being exerted by the resilient member to apply the brake.

An additional feature of the invention is the provision of a sensing and indicating circuit which senses the transition point between parking brake apply and parking brake release. In the disclosed embodiment this is accomplished by providing a normally closed, pressure opened switch which senses the parking brake release pressure and at a predetermined level is opened. The switch is in a circuit containing an indicator lamp in series with an off-on circuit control switch which may be the vehicle ignition switch. The indicator lamp is energized when the circuit control switch is closed and there is insufficient pressure to open the normally closed switch. The lamp is deenergized when the holding pressure is sufficient to open the normally closed switch, this pressure also being that required to compress the resilient member of the parking brake section and release the brake. IN THE DRAWING:

Figure 1:
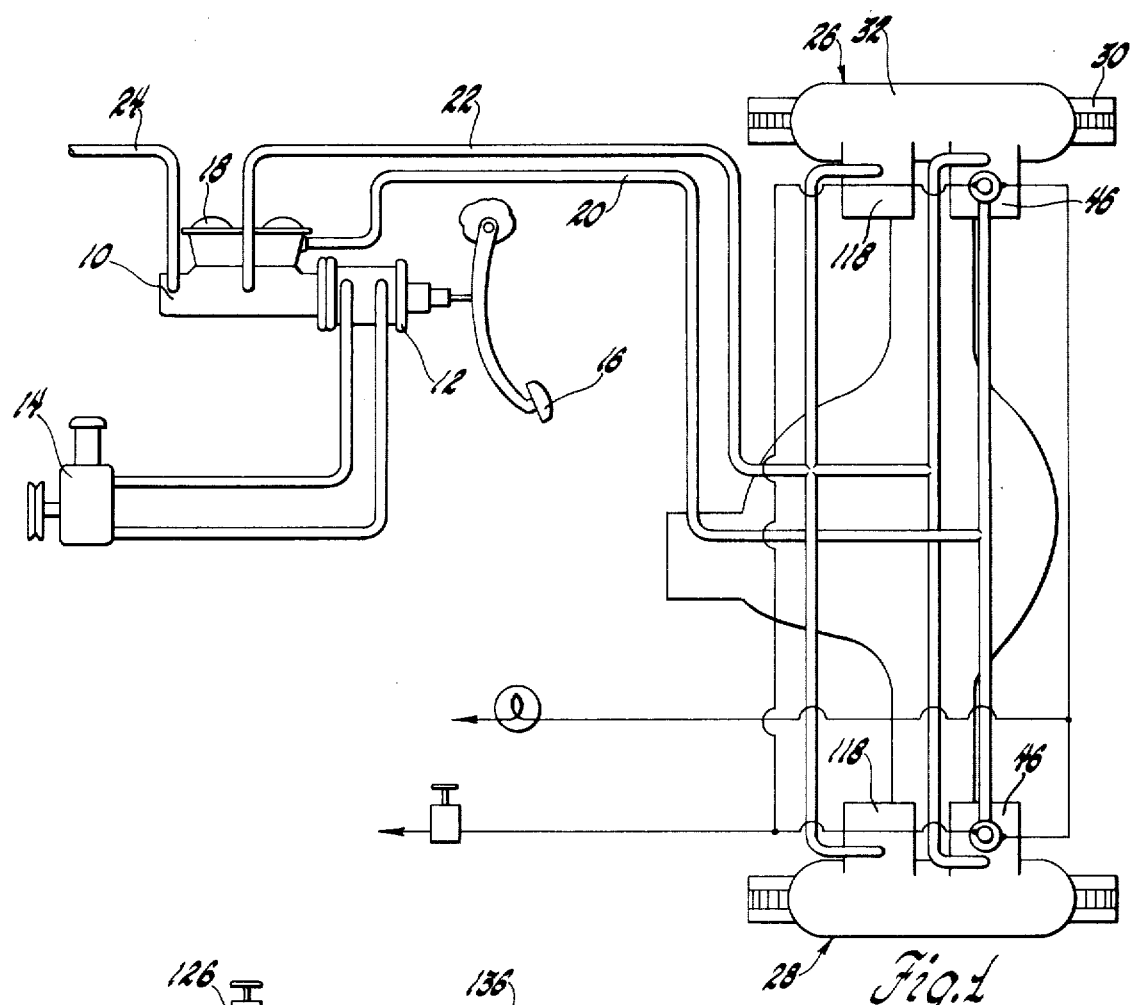
FIG. 1 is a schematic illustration of a vehicle brake system including a pair of brakes embodying the invention.

The system schematically illustrated in FIG. 1 includes a master cylinder 10 which is actuated by a hydraulic brake booster 12 powered by hydraulic pressure from pump 14 and controlled by the vehicle operator through movement of the brake pedal 16. The master cylinder has a reservoir 18 to which a return conduit 20 is connected. A brake apply pressure conduit 22 communicates one of the brake pressurizing chambers of the master cylinder 10 with one axle set of brakes, and brake apply pressure conduit 24 is arranged to communicate the other of the brake pressurizing chambers of the master cylinder of another axle set of brakes. Only one axle set of brakes is illustrated. These brakes include brake assemblies 26 and 28. Since the two brake assemblies are substantially identical, only brake assembly 26 will be further described. This assembly is shown in detail in FIG. 2.

Brake assembly 26 is associated with and includes rotatable disc 30 which is secured to a vehicle wheel, not shown, for rotation with the wheel. The caliper assembly 32 includes a caliper housing 34 having a bridge section 36 extending across the periphery of disc 30 and joining the outboard caliper leg 38 and the inboard caliper leg 40. The brake shoe assemblies 42 and 44 are mounted in caliper housing 34 for friction braking engagement with opposite sides of disc 30 when the brake is actuated. Inboard caliper leg 40 includes a cylinder housing section 46 having a cylinder bore 48 formed therethrough in axially parallel relation with the axis of rotation of disc 30. A pressure responsive brake apply piston 50 is reciprocably mounted in the end of cylinder bore 48 adjacent brake pad assembly 44. One end of the piston 50 is a brake actuator which engages pad assembly 44 for brake actuation. A fixed wall 52 is mounted in cylinder bore 48 and divides the cylinder housing into a service brake section 54 and a parking brake section 58. The service brake section includes piston 50 and the pressurizing chamber 56. That chamber is defined by piston 50, wall 52, and a portion of cylinder bore 48. The parking brake section 58 is on the other side of fixed wall 52. An end plate 60 covers the inboard end of cylinder bore 48 and is provided with an aperture 62 containing an air filter 64. A pressure responsive parking brake release piston 66 is reciprocably received in the inboard end of cylinder bore 48 and cooperates therewith to define release pressure chamber 68 on the other side of wall 52 from chamber 56. A resilient member which is provided as yieldable pre-loaded compression spring 70 is positioned in the spring chamber 72 formed in the inboard end of cylinder bore 48 by piston 66 and end plate 60. A floating push rod 74 extends through an aperture 76 in fixed wall 52 and has one end 78 engageable with piston 50 and the other end 80 engageable with piston 66. Seal 82 between aperture 76 and push rod 74 and seal 84 between the outer periphery of wall 52 and cylinder bore 48 prevent fluid pressure from being communicated between chambers 56 and 68. Piston seals 86 and 88 respectively seal pistons 50 and 66 relative to the surface of cylinder bore 48. Piston 66 is provided with a boss 90 which is engageable with end wall 60 to limit leftward movement of piston 66.

Conduit 22 is connected to a passage 92 in caliper housing 34 which is directly in fluid communication with chamber 56. A check valve chamber 94 is provided in caliper housing 34 and is in direct fluid communication with chamber 68 through passage 96. A cross passage 98 connects passage 92 and passage 96 through chamber 94 and has a check valve 100 cooperating with valve seat 102 at the end of passage 98 where the passage joins chamber 94. A check valve spring 104 lightly urges the check valve 100 closed against its seat 102 so that the check valve will prevent any transfer of fluid flow or pressure from passage 96 to passage 92 but will permit fluid flow and pressure to be transferred from passage 92 to passage 96 through chamber 94. A normally closed pressure sensing switch 106 is mounted in one end of chamber 94 so that the switch is exposed to fluid pressure in chamber 68, passage 96 and chamber 94 at all times. As will be discussed below this switch is set to open at some predetermined pressure which is comparable to the transition point between parking brake section apply and release.

Another valve chamber 108 in caliper housing 34 has an annular valve seat 110, the opening through the valve seat connecting chamber 108 with chamber 94. A normally closed plunger type valve 112 cooperates with valve seat 110. The plunger valve is schematically illustrated as forming an armature of a valve opening solenoid 114 while being urged in the valve closed position by spring 116. Chamber 108 is connected to conduit 20 so that the chamber is always at reservoir pressure, which may be substantially atmospheric pressure, found in master cylinder reservoir 18. Passage 96 and chamber 94 may be considered to be a first fluid passage and passage 92 may be considered to be a second fluid passage, with check valve 100 being therebetween and permitting fluid pressure communication only from the second fluid passage to the first fluid passage.

In the brakes 26 and 28 illustrated in FIG. 1, a second cylinder housing 118 is provided so that additional actuating piston area is used, and branches of brake apply pressure conduit 22 are connected to the brakes for this purpose. These cylinder housings are not necessarily provided with parking brake sections, however, and are not illustrated as having such sections. Therefore conduit 20 is connected only to cylinder housing 46 of each brake.

The sensing, indicating and parking brake release mechanisms and circuitry include normally closed, pressure opened switch 106; a suitable source of electrical energy schematically illustrated as battery 120; on-off switch 122, which may be the vehicle ignition switch; indicator lamp 124; normally open control switch 126; solenoid 114; and suitable electrical leads. The sensing and indicating circuit includes battery 120, which has one terminal grounded through electrical lead 128. The other battery terminal is connected through electrical lead 130 to one terminal of switch 106. The other terminal of this switch is connected by electrical lead 132 through switch 122 and indicator lamp 124 to ground, completing the circuit. When switch 122 is closed and there is no pressure in chamber 94, the indicator lamp 124 is energized. When sufficient pressure is built up in chamber 94, as will be described, switch 106 is opened and indicator lamp 124 is deenergized. This will indicate to the operator that the parking brake section has moved from the brake apply condition to the brake release condition. When the pressure in chamber 94 decreases below the pressure comparable to this transition point, with switch 122 still closed, lamp 124 will be energized so as to indicate to the vehicle operator that the parking brake section has changed from the brake release condition to the brake apply condition.

The parking brake release circuit includes electrical lead 134, which is connected to battery 120 at the same terminal to which electrical lead 130 is connected. Switch 126 is in electrical lead 134 in series with one terminal of solenoid 114. The other terminal of the solenoid 114 is connected to ground through electrical lead 136. Switch 126 is preferably of the type which is closed only when it is manually held closed by the vehicle operator. Solenoid 114 is therefore energized only when switch 126 is closed by the operator and only so long as the switch is manually held closed. When solenoid 114 is energized, it moves plunger valve 112 upwardly against the force of spring 116, opening valve seat 110 and establishing fluid communication between chamber 68 and master cylinder reservoir 18 through passage 96, chamber 94, valve seat 110, chamber 108, and conduit 20. This action releases any pressure in chamber 68 to cause the parking brake section to be applied.

Figure 2:
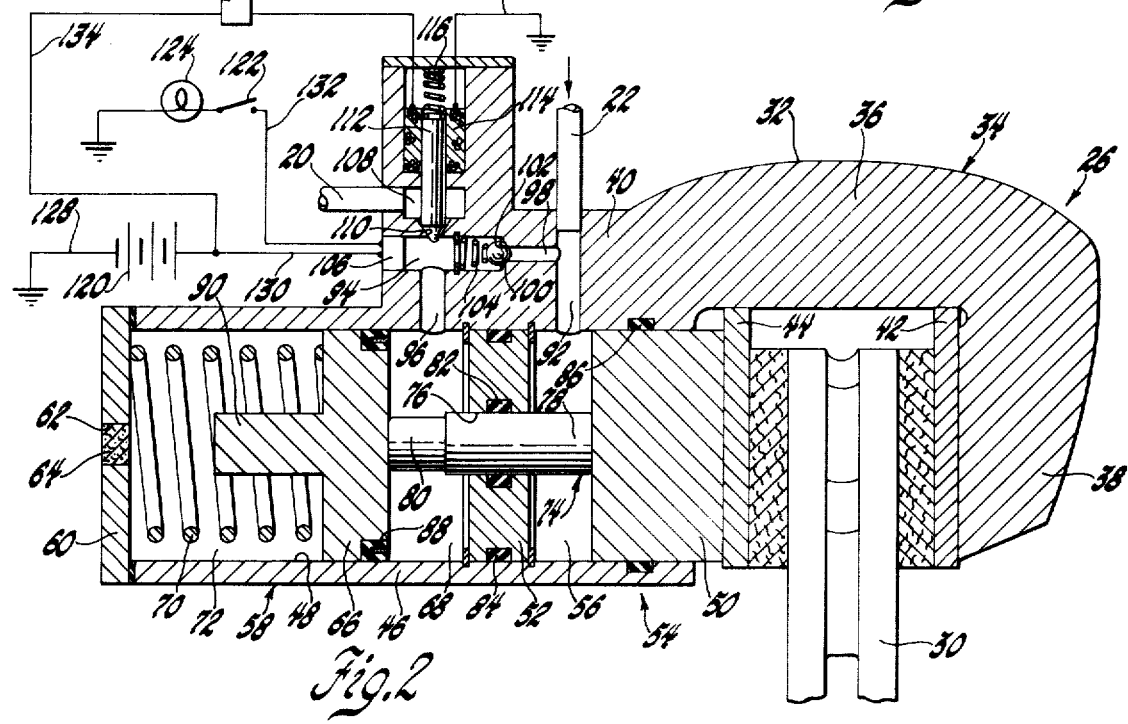
FIG. 2 is a cross section view, with parts broken away, illustrating one of the brakes in the system of FIG. 1, and including schematically illustrated portions of the system.

Assuming the vehicle in which the system is installed to be parked and with no pressure in conduit 22 or chambers 56 and 68, and with ignition switch 122 open, lamp 124 is not energized. The force in spring 70 has moved piston 66 rightwardly as seen in FIG. 2 against push rod 74, which has in turn engaged piston 50 so that a compressive brake apply force is exerted through the pistons and the push rod against the brake pad assembly 44 to mechanically hold the brake in the actuated condition. The vehicle operator can at any time determine that the parking brake section 58 is in the apply condition by closing switch 122, so that lamp 124 will be energized if this condition exists. When the vehicle operator desires to move the vehicle, he must release the parking brake section after starting the vehicle engine. He first actuates master cylinder 10 by moving brake pedal 16 to actuate booster 12, thereby generating a brake apply pressure in conduit 22. This pressure is transmitted through passage 92 into chamber 56, and also through passage 98 to open check valve 100. Brake apply fluid is then moved past check valve 100 into chamber 94 and through passage 96 into chamber 68. Since switch 126 is open and solenoid 114 is deenergized, spring 116 holds valve 112 closed against its east 110 so that there is no fluid communication between chamber 94 and 108. Depending upon the displacement of the master cylinder during its stroke, the operator may stroke the brake pedal 16 one or more times to transfer sufficient brake fluid past check valve 100 at a sufficiently high pressure to move piston 66 leftwardly against spring 70. It will be noted that upon each release of the brake pedal between such strokes check valve 100 will close so as to trap any pressure built up in chamber 68 by the previous stroke. This pumping action may continue until a sufficiently high pressure and volume of brake fluid has been introduced into chamber 68 to move piston 66 leftwardly to the parking brake release position. As the pressure in chamber 68 builds up, parking brake apply force is being stored in spring 70. When piston 66 has moved leftwardly sufficiently far to disestablish the compressive force transmission of spring force from piston 66 to piston 50 through push rod 74, the pressure 68 is at some predetermined pressure such as 1200 p.s.i. This may be the pressure to which switch 106 opens, deenergizing lamp 124 and indicating to the vehicle operator that the parking brake has been released. Whenever the vehicle operator releases brake pedal 16, the brake apply pressure in chamber 56 is released. However, check valve 100 holds pressure in chamber 68. The vehicle operator may then apply and release the service brake section 54 by the normal manner of brake actuation, without further affecting the parking brake section 58. If for any reason the pressure in chamber 68 should slightly decrease while the vehicle is being operated, lamp 124 will be energized if the pressure falls below that holding switch 106 open. The operator may then recharge chamber 68 by simply applying brake pressure in the normal manner, building up the pressure in chamber 68 until lamp 124 is again deenergized.

When the vehicle is stopped and the parking brake section 58 is to be actuated, the vehicle operator closes switch 126, energizing solenoid 114. The solenoid moves plunger valve 112 upwardly, opening valve seat 110. The release pressure trapped in chamber 68, passage 96, and passage 94 is immediately vented through chamber 108 and conduit 20 to the reservoir 18, the pressure dropping to the pressure of the reservoir. The operator maintains the solenoid 114 energized for a sufficient length of time so that spring 70 expands and moves piston 66 rightwardly as seen in FIG. 2, forcing fluid out of chamber 68 and into the reservoir 18. Indicating lamp 124 will be energized when the pressure passes the transition point sensed by switch 106, assuming that switch 122 has remained closed. The force stored in spring 70 is released in this manner and is transmitted compressively through push rod 74 to piston 50, moving the piston against braked pad assembly 44 and actuating the brake. The force exerted by spring 70 is sufficient to hold the brake actuated with enough braking force to meet the parking requirements of the vehicle. The operator may then release switch 126 and permit plunger valve 112 to again engage its valve seat 110. The operator does not then actuate brake pedal 16, and no pressure is contained in chambers 56 and 68. The action of spring 70 will continue to exert its braking force without requiring any pressure to be held or any electrical circuitry to be energized. After the vehicle ignition switch 122 is opened, lamp 124 will no longer be energized and will not act as an electrical drain on battery 120 while the vehicle is parked. When the vehicle is again to be operated, the operator goes through the same procedure as described above to release the parking brake section.

What is claimed is:
1. A parking and service brake comprising:
   a rotatable element to be braked and friction braking means for friction braking engagement therewith;
   a brake actuating and release mechanism;
   a selectively actuated master cylinder having a fluid pressurizing chamber and a fluid reservoir;
   a first fluid conduit fluidly connecting said master cylinder fluid reservoir and said brake actuating and release mechanism;
   a second fluid conduit fluidly connecting said master cylinder fluid pressurizing chamber and said brake actuating and release mechanism;
   said brake actuating and release mechanism including
      a housing having a cylinder bore therein,
      a fixed wall dividing said cylinder bore into first and second fluid pressure chambers,
      first and second pistons reciprocably received in said cylinder bore on opposite sides of said fixed wall and respectively defining movable end walls of said first and second chambers, said second piston operatively engaging said friction braking means to exert braking forces thereon as said second piston is urged in the brake applying direction away from said fixed wall,
      an axially movable push rod sealingly extending through an aperture in said fixed wall and engageable by said pistons to transmit forces only in compression between said pistons,
      a pre-loaded compression spring in said cylinder bore engaging said first piston and continually urging said first piston toward said push rod and said second piston, said spring exerting a brake apply force compressibly therethrough in one condition of operation,
      and first and second fluid passages in said housing respectively connecting with said first and second chambers and having a check valve therebetween permitting fluid flow and pressure communication only from said second fluid passage to said first fluid passage,
      said first passage having an outlet port fluidly connected with said first fluid conduit and a normally closed but selectively opened valve fluidly intermediate said outlet port and the connection of said first passage and said check valve,
      said second passage having a port fluidly connected with said second fluid conduit to receive fluid delivered under pressure from said master cylinder pressurizing chamber and deliver the same to said second fluid pressure chamber at desired brake actuating pressure levels when said master cylinder is actuated;
   said master cylinder also delivering fluid under pressure from said fluid pressurizing chamber to said second passage and through said check valve and said first passage to said first fluid pressure chamber to urge said first piston away from said fixed wall and compress said spring to store force therein, said check valve and said normally closed valve holding fluid pressure in said first fluid pressure chamber and said first passage upon release of fluid pressure in said second fluid chamber and said second passage to keep force stored in said spring by compression thereof and to permit said second piston to move toward said fixed wall to release the brake;
   and means controlled independently of actuation of said master cylinder to open said normally closed valve to communicate said first fluid pressure chamber and said first passage to said reservoir through said first fluid conduit to release the pressurized fluid in said first fluid pressure chamber and said passage, thereby releasing the force stored in said spring to move said first piston against said push rod and to move said push rod against said second piston to exert the force released from said spring to cause said friction braking means to engage said rotatable element in friction braking relation, said check valve acting when said normally closed valve is open and fluid pressure is being delivered to said second passage to permit fluid flow therethrough from said second passage into said first passage and thence through said open normally closed valve and said first fluid conduit to said fluid reservoir to return any fluid displaced through said second passage under these conditions to said fluid reservoir.

* * * * *